(12) United States Patent
Myron et al.

(10) Patent No.: US 10,406,963 B1
(45) Date of Patent: Sep. 10, 2019

(54) VEHICLE SECURING APPARATUSES

(71) Applicants: Thomas Neil Myron, Shreveport, LA (US); J. J. Keeth, Shreveport, LA (US)

(72) Inventors: Thomas Neil Myron, Shreveport, LA (US); J. J. Keeth, Shreveport, LA (US)

( * ) Notice: Subject to any disclaimer, the term of this patent is extended or adjusted under 35 U.S.C. 154(b) by 0 days.

(21) Appl. No.: 15/908,968

(22) Filed: Mar. 1, 2018

(51) Int. Cl.
B60P 3/073 (2006.01)
B60D 1/48 (2006.01)
B60D 1/56 (2006.01)

(52) U.S. Cl.
CPC .............. B60P 3/073 (2013.01); B60D 1/481 (2013.01); B60D 1/56 (2013.01)

(58) Field of Classification Search
CPC ............ B60P 3/073; B60D 1/481; B60D 1/59
See application file for complete search history.

(56) References Cited

U.S. PATENT DOCUMENTS

| 1,375,266 | A | * | 4/1921 | Weber | B60D 1/04 280/510 |
| 1,398,547 | A | * | 11/1921 | Graham | B60D 1/26 280/504 |
| 1,408,501 | A | * | 3/1922 | Clement | B60D 1/04 280/504 |
| 1,411,230 | A | * | 3/1922 | Weber | B60D 1/04 280/504 |
| 1,586,532 | A | * | 6/1926 | Pampinella | B62D 33/0273 105/285 |
| 2,221,492 | A | * | 11/1940 | Sawyer | B60D 1/26 280/504 |
| 3,128,107 | A | * | 4/1964 | Miller | B60D 1/28 24/599.1 |
| 5,647,604 | A | * | 7/1997 | Russell | B60D 1/00 280/492 |
| 5,725,229 | A | * | 3/1998 | McWethy | B60D 1/06 280/416.1 |
| 6,086,298 | A | | 7/2000 | Fanuele et al. | |
| 6,099,219 | A | | 8/2000 | Bartholomay | |
| 6,139,043 | A | * | 10/2000 | Gries | B60D 1/00 280/491.5 |

(Continued)

Primary Examiner — Hilary L Gutman
(74) Attorney, Agent, or Firm — R. Keith Harrison

(57) ABSTRACT

Vehicle securing apparatuses may include a main support arm. A base arm may be carried by the main support arm. A retainer assembly arm may be carried by the main support arm in spaced-apart relationship to the base arm. A retainer space may be defined by and between the base arm and the retainer assembly arm. A retainer assembly may include a retainer hasp pivotally carried by the retainer assembly arm. The retainer hasp may be pivotal between a retaining position extending into the retainer space and a release position substantially clearing the retainer space by application of force from outside and toward the retainer space against the retainer hasp. A hasp retaining member may be disposed in mechanical cooperation with the retainer hasp to normally maintain the retainer hasp in the retaining position on the retainer assembly arm. Accordingly, a structural member on an ATV or other vehicle may be extended into the retainer space as the structural member pushes the retainer hasp from the retaining position to the release position. The retainer hasp may return to the retaining position to retain the structural member in the retainer space as the structural member clears or passes beyond the retainer hasp.

4 Claims, 13 Drawing Sheets

(56) References Cited

U.S. PATENT DOCUMENTS

| | | | |
|---|---|---|---|
| 6,450,472 B1 | 9/2002 | Cook, Jr. | |
| 6,474,916 B2* | 11/2002 | Constantin | A61G 3/0808 410/4 |
| 7,055,845 B1* | 6/2006 | Putnam | B60D 1/28 280/490.1 |
| 7,147,415 B2 | 12/2006 | Rorie et al. | |
| 7,232,281 B2 | 6/2007 | Fullenkamp | |
| 7,246,731 B1 | 7/2007 | Matherne, Sr. | |
| 7,287,942 B1* | 10/2007 | Valkenburgh | B60P 3/075 410/19 |
| 7,686,549 B1* | 3/2010 | Posey | B60P 3/073 410/19 |
| 7,785,050 B2 | 8/2010 | Fonseca, Jr. | |
| 8,267,627 B1* | 9/2012 | Ward | B60P 3/073 410/3 |
| 8,297,894 B1 | 10/2012 | Williams | |
| 9,114,678 B1* | 8/2015 | Olson | B60D 1/04 |
| 9,272,654 B1* | 3/2016 | Powell | B60P 3/073 |
| 2005/0220557 A1* | 10/2005 | Rorie | B60P 3/00 410/7 |
| 2006/0027425 A1 | 2/2006 | Coyer | |
| 2006/0159541 A1* | 7/2006 | Fullenkamp | B60P 3/073 410/3 |
| 2007/0286696 A1* | 12/2007 | Hackenmueller | B60P 3/073 410/8 |
| 2008/0199271 A1* | 8/2008 | Burry | B60P 3/073 410/3 |
| 2008/0247836 A1* | 10/2008 | Erb | B60P 3/073 410/7 |
| 2009/0072516 A1* | 3/2009 | Kuenzel | B60D 1/065 280/477 |
| 2009/0155034 A1* | 6/2009 | Fonseca, Jr. | B60P 1/435 414/480 |
| 2009/0250564 A1* | 10/2009 | Glover | B60P 3/073 248/125.3 |

* cited by examiner

US 10,406,963 B1

VEHICLE SECURING APPARATUSES

FIELD

Illustrative embodiments of the disclosure generally relate to vehicles such as all-terrain vehicles (ATVs), lawnmowers and the like. More particularly, illustrative embodiments of the disclosure relate to vehicle securing apparatuses which are suitable for securing a vehicle such as an ATV in a stable position on a transporting trailer or on the ground or other surface.

BACKGROUND

The background description provided herein is solely for the purpose of generally presenting the context of the illustrative embodiments of the disclosure. Aspects of the background description are neither expressly nor impliedly admitted as prior art against the claimed subject matter.

All-terrain vehicles (ATVs) are motorized vehicles typically having four or six wheels. The popularity of ATVs has increased considerably in recent years. ATVs are frequently used for recreation or in hunting, camping and other outdoor pursuits to transport game, equipment and the like. ATVs are commonly transported in the bed of a pickup truck or on a flatbed trailer. However, a lack of suitable methods for securing an ATV in a pickup truck or on a trailer may render the ATV vulnerable to inadvertently rolling in the pickup truck bed or on the trailer during transport. Moreover, failure to properly secure the ATV may render the ATV vulnerable to theft under some circumstances.

Therefore, vehicle securing apparatuses which are suitable for securing a vehicle such as an ATV in a stable position on a transporting trailer or on the ground or other surface are desirable for some applications.

SUMMARY

Illustrative embodiments of the disclosure are generally directed to vehicle securing apparatuses suitable for securing a vehicle such as an ATV in a stable position on a transporting trailer or on the ground or other surface. An illustrative embodiment of the vehicle securing apparatuses may include a main support arm. A base arm may be carried by the main support arm. A retainer assembly arm may be carried by the main support arm in spaced-apart relationship to the base arm. A retainer space may be defined by and between the base arm and the retainer assembly arm. A retainer assembly may include a retainer hasp pivotally carried by the retainer assembly arm. The retainer hasp may be pivotal between a retaining position extending into the retainer space and a release position substantially clearing the retainer space by application of force from outside and toward the retainer space against the retainer hasp. A hasp retaining member may be disposed in mechanical cooperation with the retainer hasp to normally maintain the retainer hasp in the retaining position on the retainer assembly arm. Accordingly, a structural member on an ATV or other vehicle may be extended into the retainer space as the structural member pushes the retainer hasp from the retaining position to the release position. The retainer hasp may return to the retaining position to retain the structural member in the retainer space as the structural member clears or passes beyond the retainer hasp.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the subject matter as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
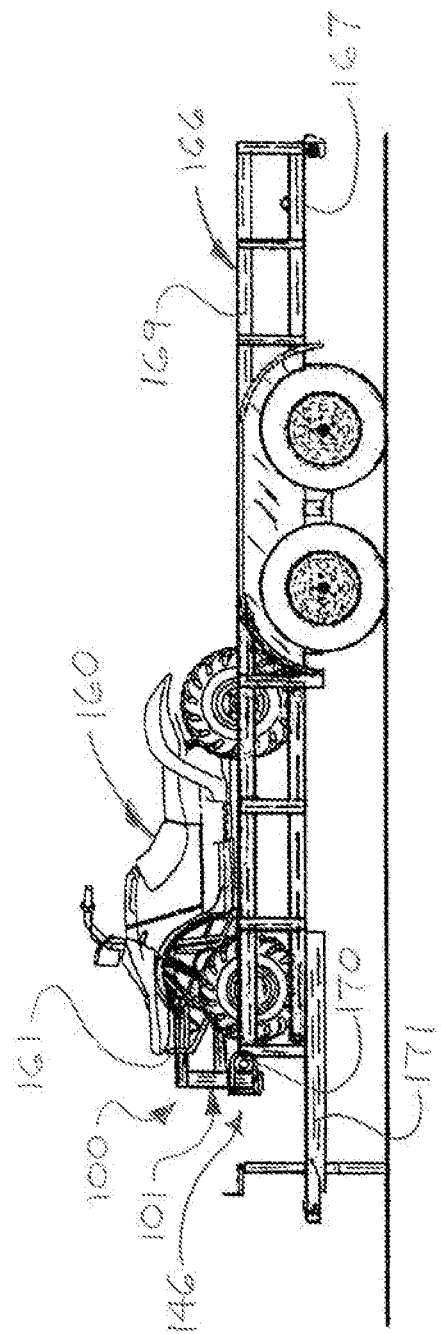
FIG. 1 is a side view of a typical flatbed trailer, with an illustrative embodiment of the vehicle securing apparatuses securing an ATV in place on the trailer in typical application of the vehicle securing apparatuses.
Figure 2:
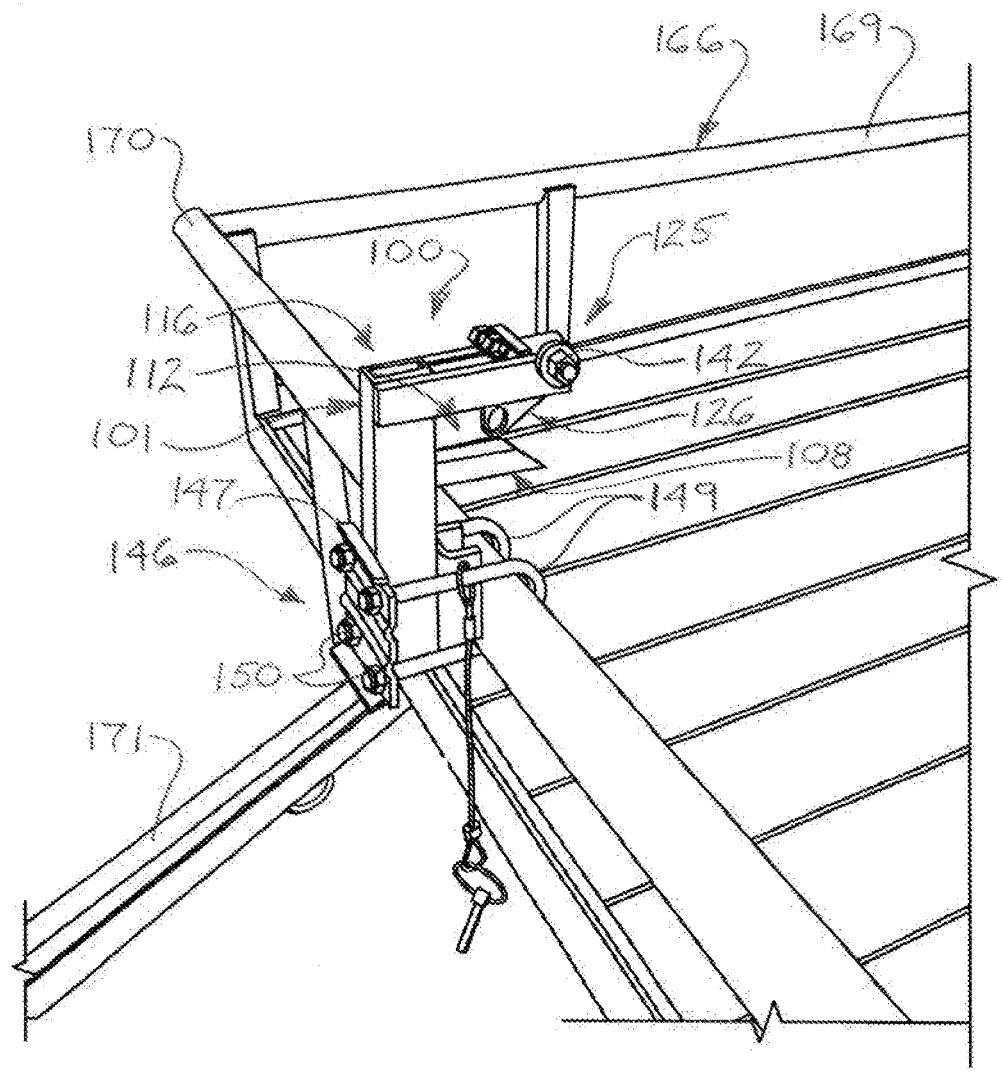
FIG. 2 is a perspective view of the illustrative vehicle securing apparatus on the flatbed trailer.
Figure 3:
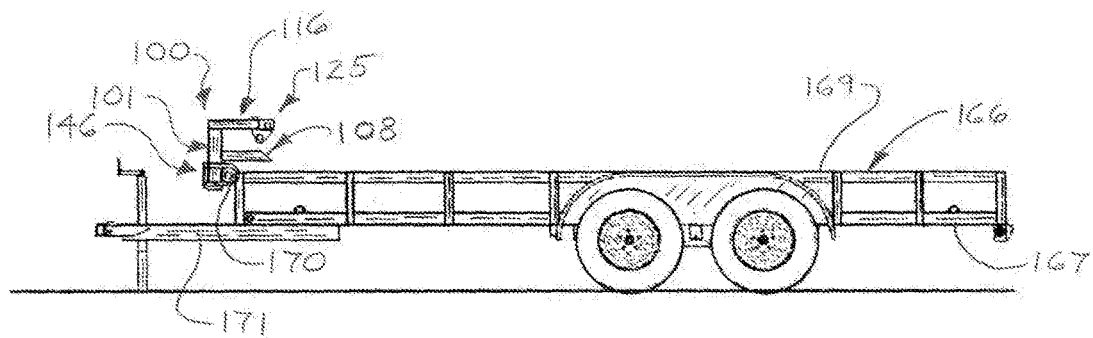
FIG. 3 is a side view of the flatbed trailer and the illustrative vehicle securing apparatus on the trailer, with the ATV (not illustrated) removed from the trailer.

Referring initially to FIG. 1 of the drawings, an illustrative embodiment of the vehicle securing apparatuses is generally indicated by reference numeral 100. As will be hereinafter described, in some applications, the vehicle securing apparatus 100 may be provided on a flatbed trailer 166 for the purpose of securing a vehicle such as an ATV (All-Terrain Vehicle) 160 in a stable position on the trailer 166 typically for transport and/or storage of the ATV 160. In alternative applications, the vehicle securing apparatus 100 may facilitate stable securement of a lawnmower or any other type of vehicle on the trailer 166. The flatbed trailer 166 may have a conventional design with a wheeled trailer frame 167, a pair of trailer side rails 169 and a trailer front rail 170. A trailer ramp (not illustrated) may be selectively deployed from a rear end of the trailer frame 167 to facilitate loading and unloading of the ATV 160. A trailer tongue 171 may extend forwardly from the trailer frame 167 for coupling to a towing vehicle (not illustrated). The vehicle securing apparatus 100 may expeditiously secure and stabilize the ATV 160 on the trailer 166 to prevent the ATV 160 from inadvertently rolling backwards on the trailer 166 typically during transport and/or storage of the ATV 160 on the trailer 166. The vehicle securing apparatus 100 may further expeditiously release the ATV 160 to facilitate unloading of the ATV 160 from the trailer 166.

Figure 4:
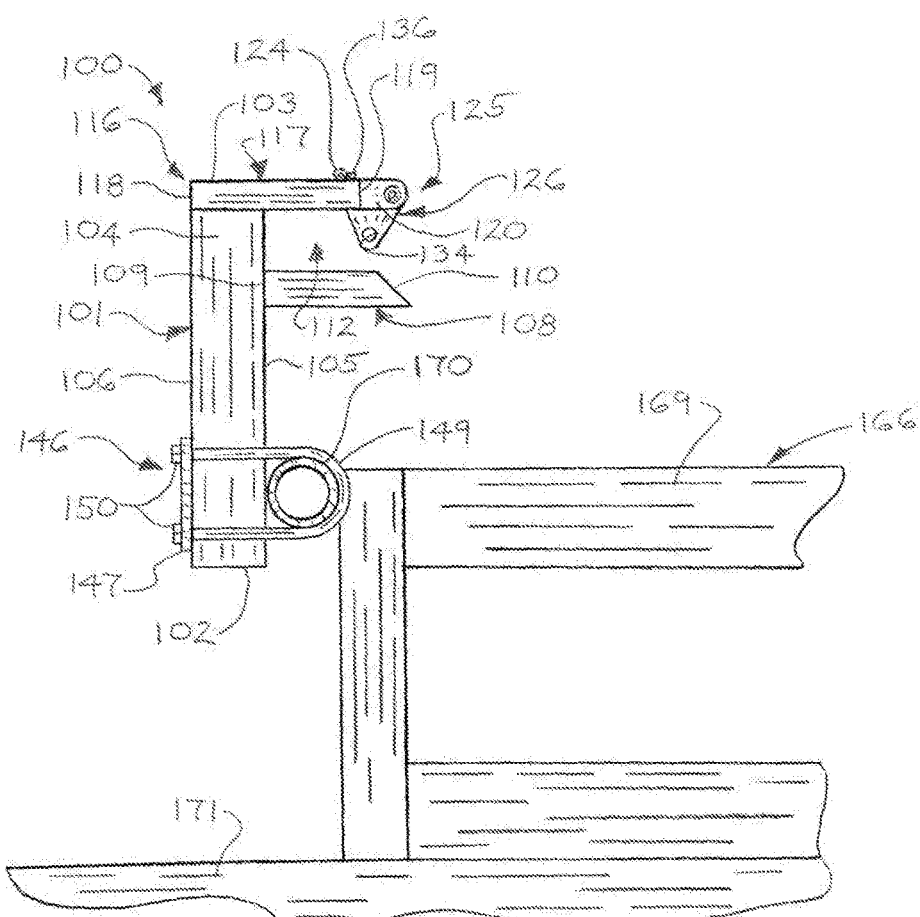
FIG. 4 is a side view of the illustrative vehicle securing apparatus on the trailer (partially in section), more particularly illustrating a typical apparatus mount assembly mounting the vehicle securing apparatus on a trailer front rail of the flatbed trailer.
Figure 5:
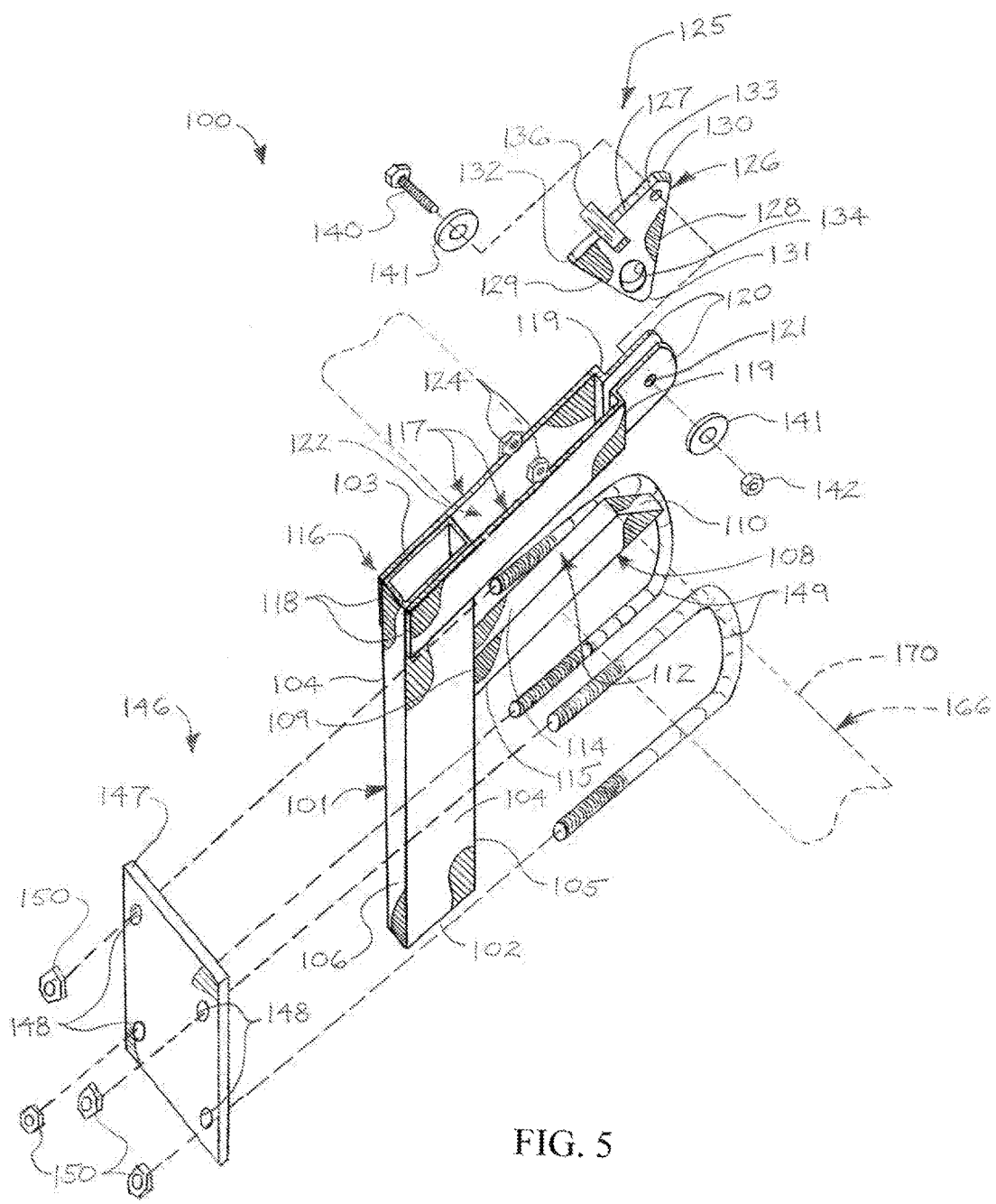
FIG. 5 is an exploded front perspective view of the illustrative vehicle securing apparatus.

Referring next to FIGS. 2-12 of the drawings, the vehicle securing apparatus 100 may include a main support arm 101. As illustrated in FIGS. 4 and 5, the main support arm 101 may have a lower arm end 102, an upper arm end 103, arm sides 104, a rear arm surface 105 and a front arm surface 106. In some embodiments, the main support arm 101 may be selectively length-adjustable or height-adjustable with respect to the trailer front rail 170 of the trailer 176 according to the knowledge of those skilled in the art and typically as will be hereinafter described.

Figure 6:
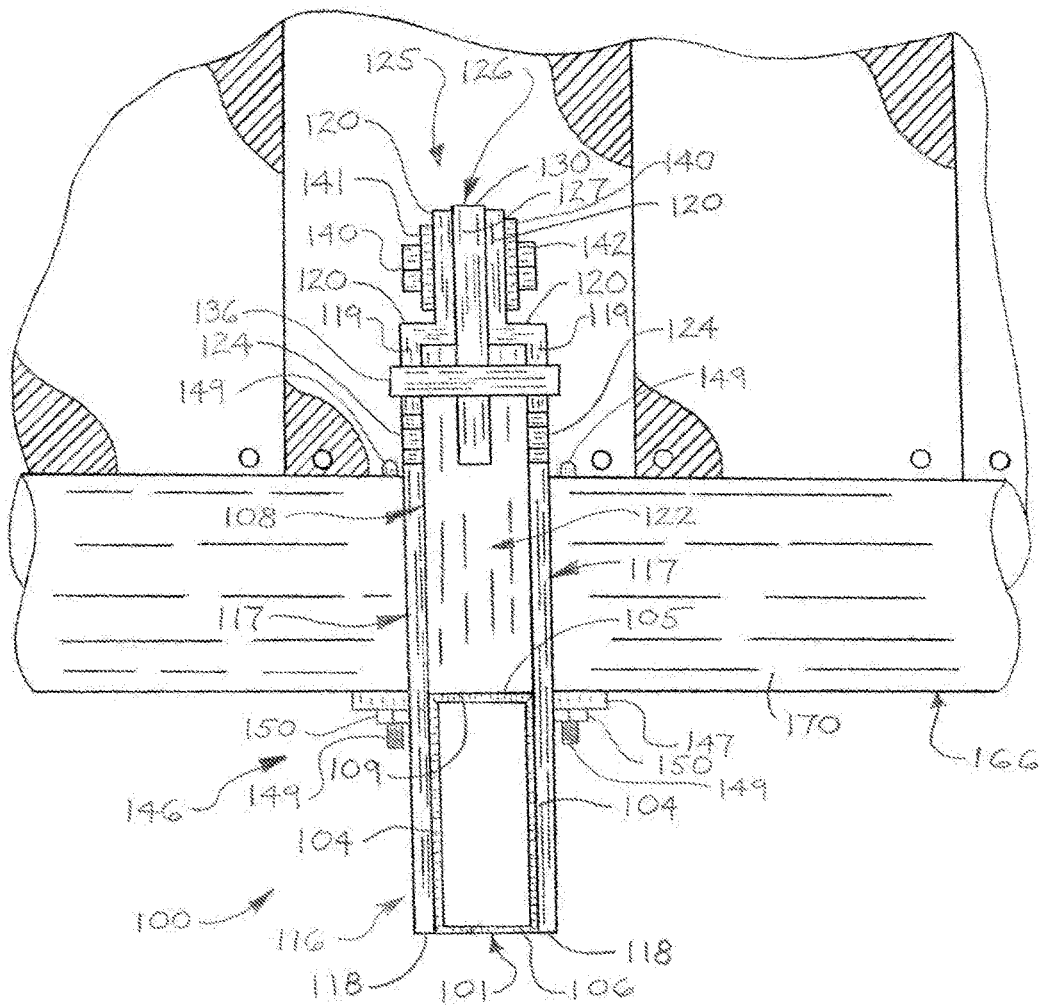
FIG. 6 is a top view of the illustrative vehicle securing apparatus mounted on the trailer front rail of the flatbed trailer (partially in section) in typical application of the vehicle securing apparatus.

A retainer assembly arm 116 may extend from the main support arm 101 beyond the rear arm surface 105. As illustrated in FIG. 4, the retainer assembly arm 116 may be disposed in substantially perpendicular relationship with respect to the main support arm 101. As illustrated in FIGS. 5 and 6, an arm space 122 may extend through the retainer assembly arm 116 for purposes which will be hereinafter described. In some embodiments, the retainer assembly arm 116 may include a pair of generally elongated, parallel, spaced-apart arm plates 117. The arm plates 117 may extend from the respective arm sides 104 beyond the rear arm surface 105 of the main support arm 101 typically at the upper arm end 103. The respective arm plates 117 may have proximal plate ends 118 at the main support arm 101 and opposite, inwardly-turned distal plate ends 119. The arm space 122 may be defined by and between the rear arm surface 105 of the main support arm 101, the arm plates 117 and the distal plate ends 119 of the respective arm plates 117. A pair of substantially parallel, spaced-apart plate flanges 120 may extend from the respective distal plate ends 119.

A base arm 108 may extend from the rear arm surface 105 of the main support arm 101. The base arm 108 may be generally elongated and disposed in substantially parallel, spaced-part relationship with respect to the retainer assembly arm 116. A retainer space 112 may be formed by and between the main support arm 101, the base arm 108 and the retainer assembly arm 116. The base arm 108 may have a proximal arm end 109 at the rear arm surface 105 of the main support arm 101, a distal arm end 110 opposite the proximal arm end 109, an upper arm surface 114 which faces the retainer space 112, and a lower arm surface 115. In some embodiments, the distal arm end 110 may taper, bevel or angle from the upper arm surface 114 to the lower arm surface 115, as illustrated, for purposes which will be hereinafter described.

Figure 7:
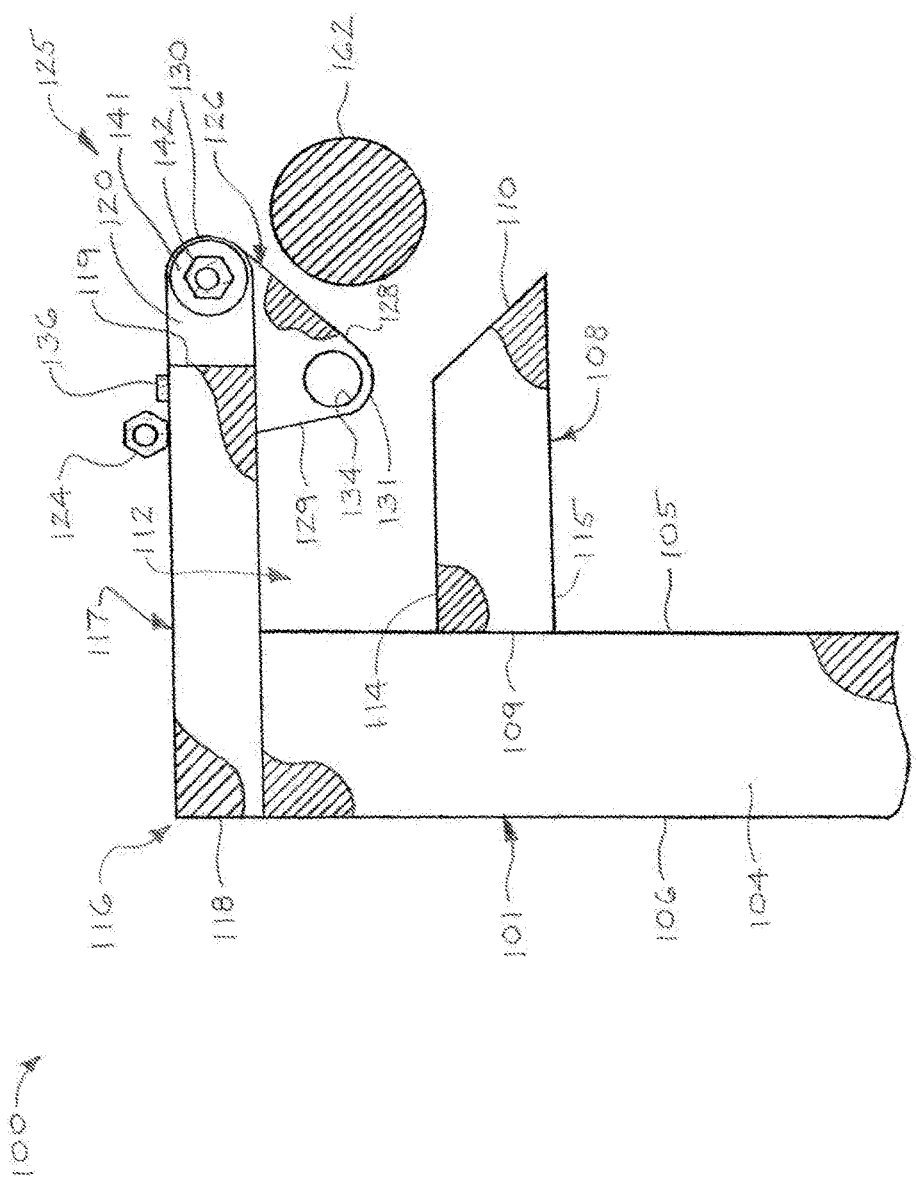
FIG. 7 is a side view of the illustrative vehicle securing apparatus (partially in section), with a retainer hasp of a retainer assembly in a retaining position on the vehicle securing apparatus preparatory to positioning of a horizontal component (in cross-section) on a structural member of the ATV in a retainer space in the vehicle securing apparatus in typical application of the vehicle securing apparatus.
Figure 8:
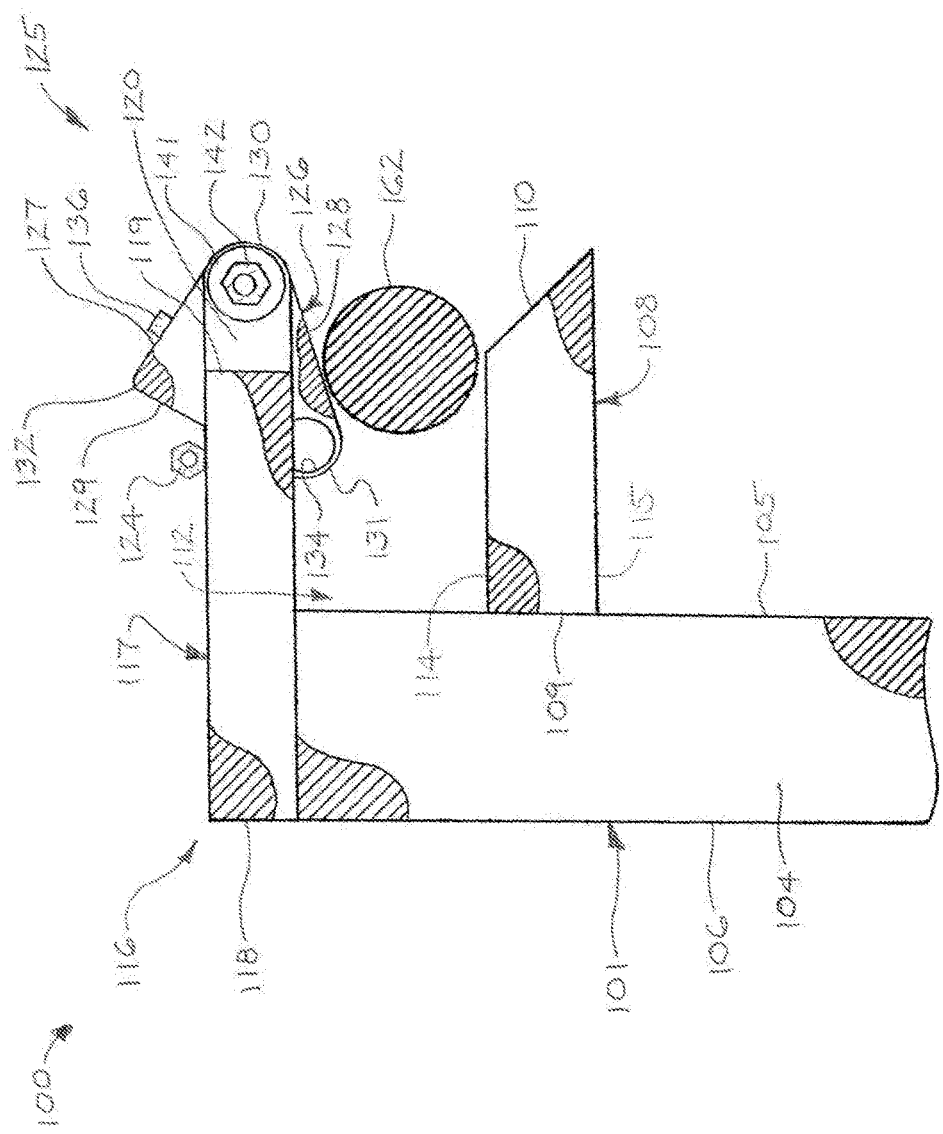
FIG. 8 is a side view of the illustrative vehicle securing apparatus, more particularly illustrating pivoting of the retainer hasp of the retainer assembly from the retaining position in a clockwise direction toward a release position on the vehicle securing apparatus as the horizontal component on the structural member of the ATV is inserted in the retainer space against the retainer hasp.
Figure 9:
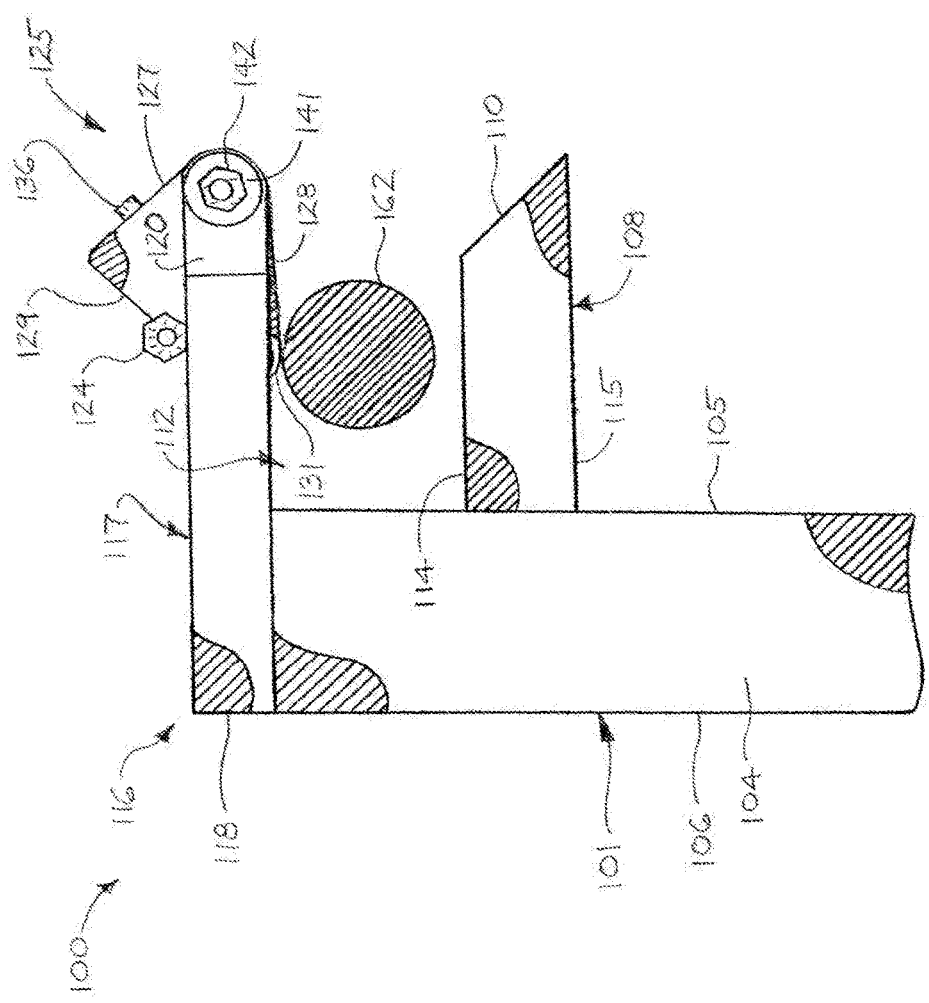
FIG. 9 is a side view of the illustrative vehicle securing apparatus, more particularly illustrating further pivoting of the retainer hasp of the retainer assembly to the release position on the vehicle securing apparatus as the horizontal component on the structural member of the ATV continues movement into the retainer space against the retainer hasp.
Figure 10:
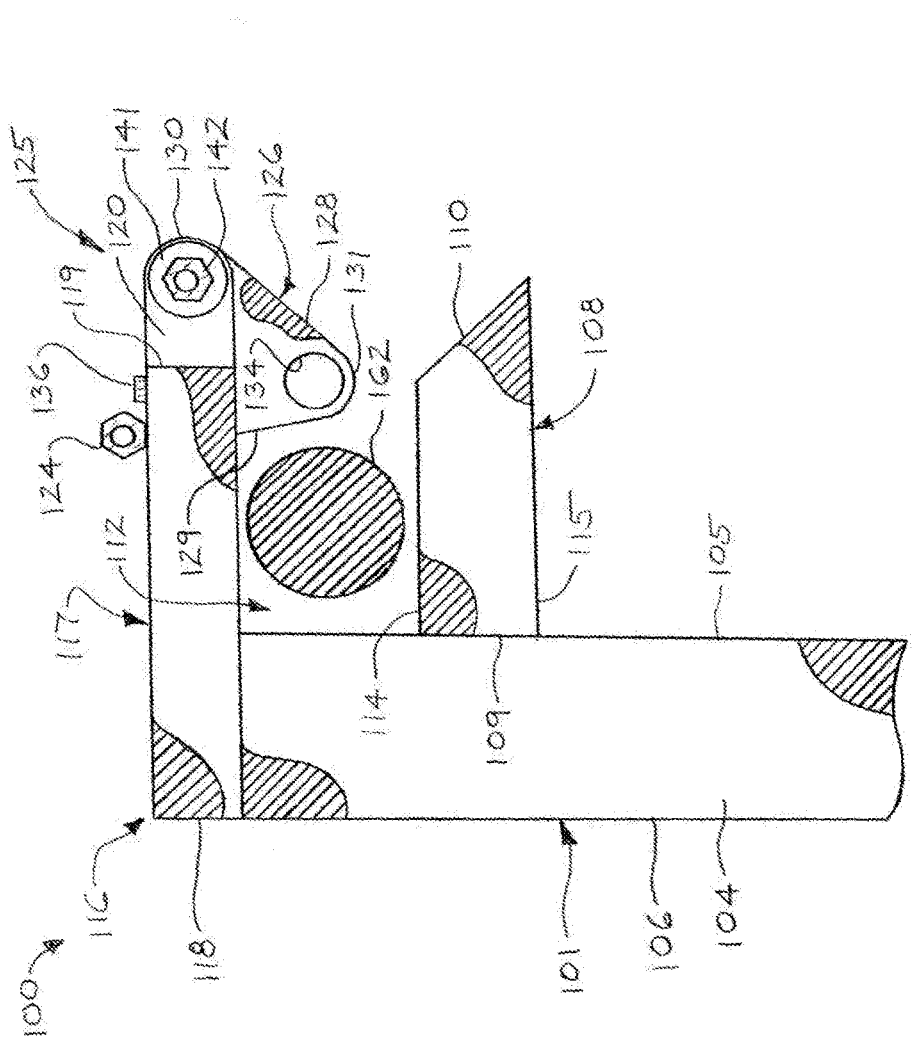
FIG. 10 is a side view of the illustrative vehicle securing apparatus, with the retainer hasp of the retainer assembly returned to the retaining position on the vehicle securing apparatus and retaining the horizontal component on the structural member of the ATV in the retainer space.
Figure 11:
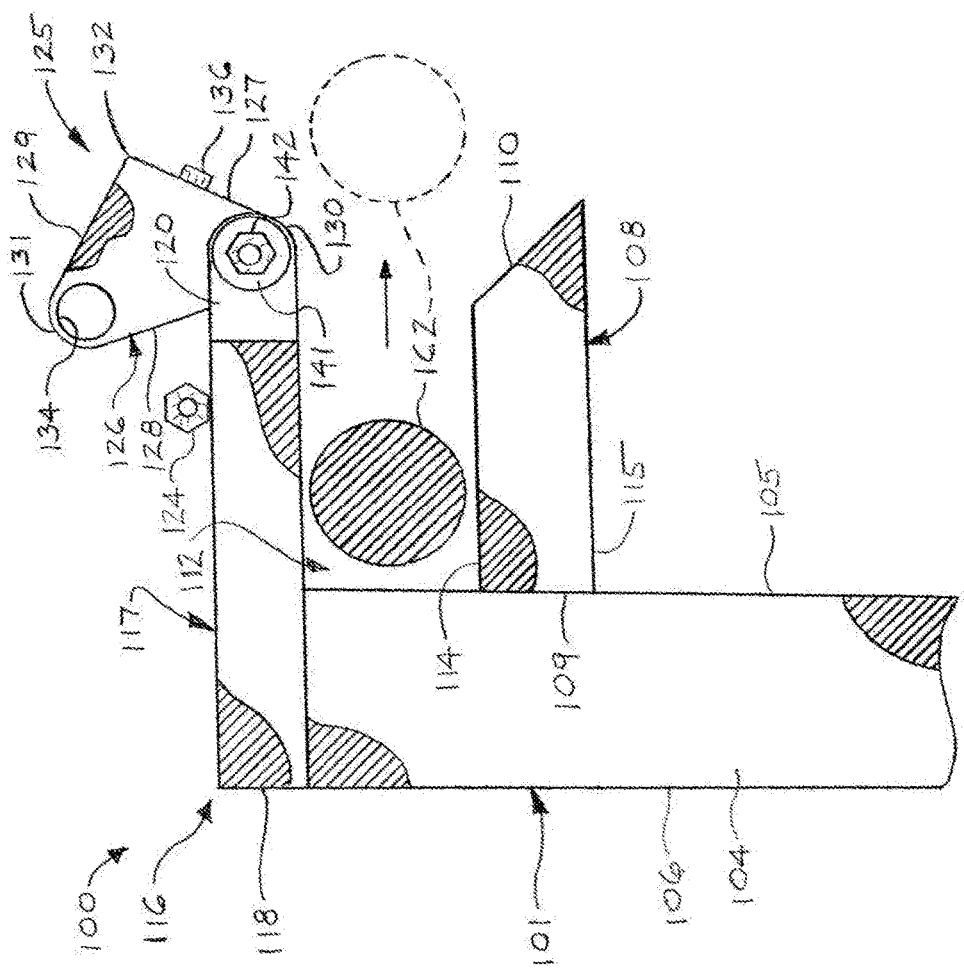
FIG. 11 is a side view of the illustrative vehicle securing apparatus, with the retainer hasp of the retainer assembly pivoted to the release position on the vehicle securing apparatus to facilitate removal of the horizontal component on the structural member of the ATV from the retainer space.
Figure 12:
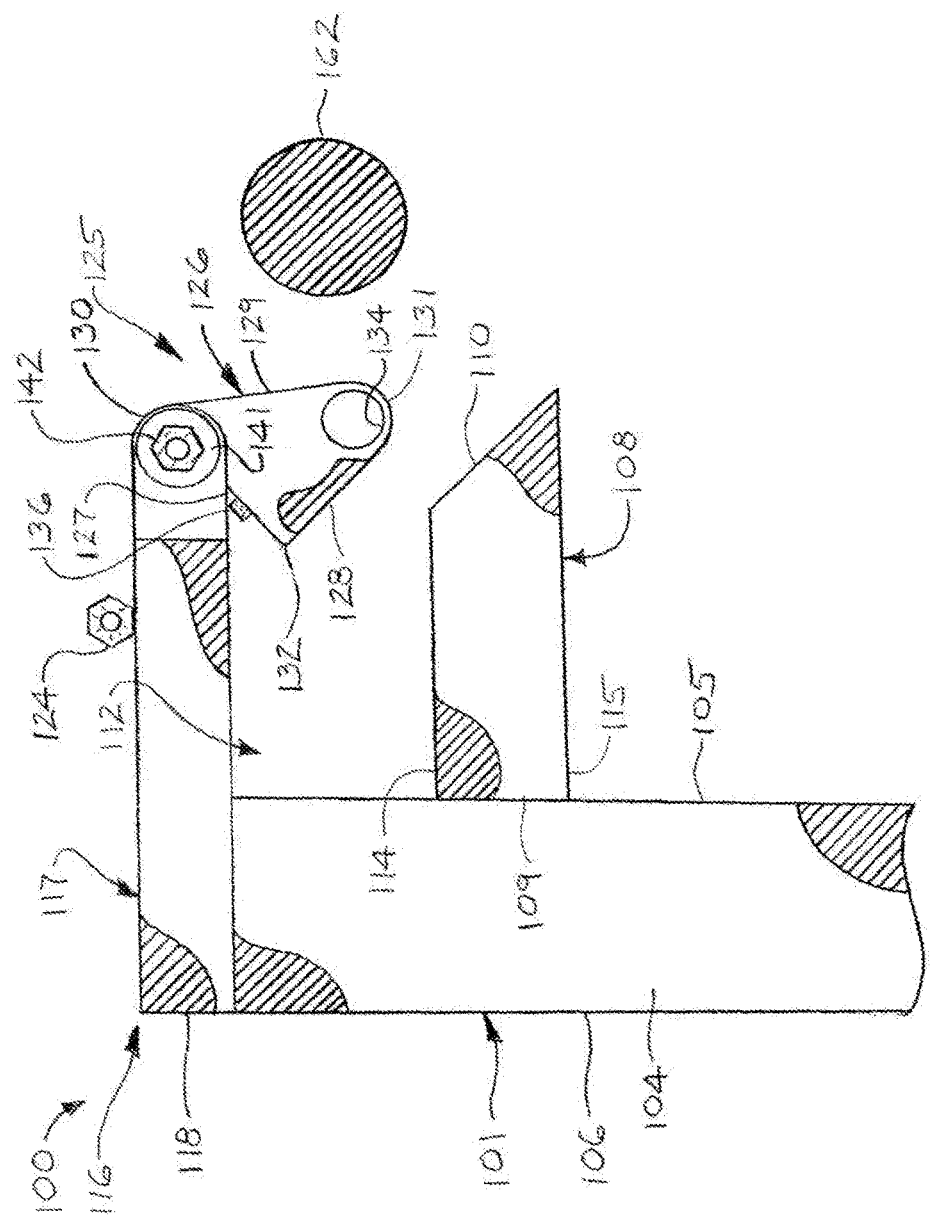
FIG. 12 is a side view of the illustrative vehicle securing apparatus, with the retainer hasp of the retainer assembly in a suspended position on the vehicle securing apparatus and the horizontal component on the structural member of the ATV removed from the retainer space.

A retainer assembly 125 may be provided on the retainer assembly arm 116. As will be hereinafter described, the retainer assembly 125 may be suitably configured to retain a horizontal component 162 (FIGS. 7-12) on a structural member 161 (FIG. 1) such as an ATV frame or front rack, for example and without limitation, of the ATV 160 in the retainer space 112. As illustrated in FIGS. 5 and 6, in some embodiments, the retainer assembly 125 may include a retainer hasp 126 which may be pivotally mounted in the arm space 122 in the retainer assembly arm 116. The retainer hasp 126 may normally be deployed in a retaining position in which the retainer hasp 126 extends into the retainer space 112, as illustrated in FIGS. 7 and 10. By application of force from outside and toward the retainer space 112 against the retainer hasp 126, the retainer hasp 126 may be pivoted in the clockwise direction in FIGS. 7-12 from the retaining position to a release position in which the retainer hasp 126 substantially clears the retainer space 112, as illustrated in FIGS. 8, 9 and 11.

As further illustrated in FIG. 5, in some embodiments, the retainer hasp 126 of the retainer assembly 125 may be generally triangular. Accordingly, the retainer hasp 126 may have a retaining edge 127. An exterior edge 128 may extend from the retaining edge 127. An interior edge 129 may extend from the exterior edge 128 to the retaining edge 127. A pivot vertex 130 may extend between the retaining edge 127 and the exterior edge 128. A retaining vertex 131 may extend between the exterior edge 128 and the interior edge 129. A return vertex 132 may extend between the interior edge 129 and the retaining edge 127. In some embodiments, the retainer hasp 126 may approximate a right triangle with the retaining edge 127 and the interior edge 129 generally approximating the respective legs and the exterior edge 128 generally approximating the hypotenuse of the triangle. Thus, the return vertex 132 may define a right angle whereas the pivot vertex 130 and the retaining vertex 131 may each have angles of 45 degrees. In alternative embodiments, the retainer hasp 126 may have the shape of a scalene or isosceles triangle or any other polygonal shape including but not limited to rectangular, pentagonal or hexagonal or an oval or other non-polygonal shape which is consistent with the functional requirements of the retainer hasp 126.

The retainer hasp 126 may be pivotally attached to the retainer assembly arm 116 in the arm space 122 (FIGS. 5 and 6) according to any suitable technique which is known by those skilled in the art. As further illustrated in FIG. 5, in some embodiments, a pivot opening 133 may extend through the retainer hasp 126 typically at the pivot vertex 130. The retainer hasp 126 may be disposed between the plate flanges 120 on the respective arm plates 117 of the retainer assembly arm 116. A hasp fastener 140 with washers 141 may be extended through a pair of aligned flange openings 121 in the respective plate flanges 120 and through the registering pivot opening 133 in the retainer hasp 126. A securing nut 142 may be threaded on the hasp fastener 140 and tightened against the corresponding washer 141.

When the retainer hasp 126 is deployed in the retaining position, as illustrated in FIGS. 7 and 10, the retaining vertex 131 of the retainer hasp 126 may be disposed within the retainer space 112 between the base arm 108 and the retainer assembly arm 116. The exterior edge 128 of the retainer hasp 126 may face away from the retainer space 112, whereas the interior edge 129 of the retainer hasp 126 may face towards the retainer space 112. Because the center of gravity of the retainer hasp 126 may generally correspond to the junction of the exterior edge 128 with the retaining vortex 131, however, the retainer hasp 126 may have a natural tendency to fall through the retainer space 112 in the retainer assembly arm 116 to the suspended position illustrated in FIG. 12. Accordingly, a hasp retaining member 136 may be disposed in mechanical cooperation with the retainer hasp 126 to normally maintain the retainer hasp 126 in the retaining position on the retainer assembly arm 116. In some embodiments, the hasp retaining member 136 may include a tab, detent, or other structural member which may normally maintain the retainer hasp 126 in the retaining position on the retainer assembly arm 116. As illustrated, in some embodiments, the hasp retaining member 136 may include a bar which may be provided on the retaining member edge 127 between the pivot vertex 130 and the return vertex 132 of the retainer hasp 126. The hasp retaining member 136 may be generally elongated and oriented in transverse relationship with respect to the plane of the retainer hasp 126, and may protrude beyond opposite surfaces of the retainer hasp 126. Therefore, as illustrated in FIGS. 7 and 10, the hasp retaining member 136 may normally rest on the arm plates 117 of the retainer assembly arm 116 against the pull of gravity to maintain the retainer hasp 126 in the retaining position and prevent the retainer hasp 126 from pivoting about the hasp fastener 140 and dropping through the arm space 122 to the suspended position of FIG. 12. In alternative embodiments, the hasp retaining member 136 may include a spring or other biasing or retaining member which biases or retains the retainer hasp 126 in the retaining position according to the knowledge of those skilled in the art. In some embodiments, a lock opening 134 may extend through the retainer hasp 126 typically at the retaining vertex 131. A padlock or the like (not illustrated) may be extended through the lock opening 134 and secured to lock the retainer hasp 126 in the retaining position.

At least one hasp retaining receptacle 124 may be provided on the retainer assembly arm 116 adjacent to the arm space 122. In some embodiments, a pair of spaced-apart, registering hasp retaining receptacles 124 may be provided on the respective arm plates 117 of the retainer assembly arm 116 on opposite sides of the arm space 122, as illustrated in FIGS. 5 and 6. Accordingly, a retaining pin (not illustrated) may be inserted through the registering hasp retaining receptacles 124 to span the arm space 122 and maintain the retainer hasp 126 in the retaining position.

As further illustrated in FIGS. 4 and 5, an apparatus mount assembly 146 may mount the main support arm 101 of the ATV mounting apparatus 100 on the trailer front rail 170 (FIGS. 2 and 4) or other structural component or element of the trailer 166. The trailer mount assembly 146 may have any design which is suitable for the purpose. In some embodiments, the trailer mount assembly 146 may include an assembly mount bracket 147. As illustrated in FIG. 5, two pairs of fastener openings 148 may extend through the assembly mount bracket 147. A pair of U-bolts 149 may be extended around the rear surface of the trailer front rail 170 and forwardly through the respective pairs of fastener openings 148 in the assembly mount bracket 147. Nuts 150 may be threaded on the U-bolts 149 and tightened against the assembly mount bracket 147 to secure the assembly mount bracket 147 against the front arm surface 106 of the main support arm 101. The height of the main support arm 101 and the base arm 108 and retainer assembly arm 116 may be selectively adjusted typically by varying the vertical position of the main support arm 101 between the assembly mount bracket 147 and the U-bolts 149 prior to tightening the nuts 150.

Referring next to FIGS. 1-4 and 7-12 of the drawings, in typical application, the vehicle securing apparatus 100 may be mounted on the trailer front rail 170 (FIG. 4) of the trailer 166 typically by deployment of the apparatus mount assembly 146, as was heretofore described with respect to FIG. 5. As illustrated in FIGS. 4 and 7, the retainer hasp 126 may normally be deployed in the retaining position with the hasp retaining member 136 typically resting on the upper surfaces of the arm plates 117. Accordingly, the retaining vertex 131 of the retainer hasp 126 may protrude into the retainer space 112, with the exterior edge 128 of the retainer hasp 126 typically facing away from the retainer space 112 and the interior edge 129 of the retainer hasp 126 typically facing toward the retainer space 112.

The ATV 160 may be loaded onto the trailer 166 typically by driving the ATV 160 up a loading ramp (not illustrated) at the rear end of the trailer frame 167. The ATV 160 may be driven forwardly toward the trailer front rail 170 of the trailer 166 until the horizontal component 162 on the structural member 161 of the ATV 160 approaches the exterior edge 128 of the retainer hasp 126, as illustrated in FIG. 7. Prior to engagement of the ATV 160 with the vehicle securing apparatus 100, the height of the retainer assembly arm 116 and retainer assembly 125 may be adjusted to vertically orient and align the retainer space 112 with the horizontal component 162 on the structural member 161 of the ATV 160. In some embodiments, this may be carried out typically by loosening the nuts 150, sliding the main support arm 101 vertically with respect to the U-bolts 149 and re-tightening the nuts 150 to secure the assembly mount bracket 147 against the main support arm 101. In other embodiments, the main support arm 101 may be telescopically and/or otherwise adjusted for the purpose.

The ATV 160 may then continue to be driven forwardly on the trailer 166 until the horizontal component 162 initially engages the exterior edge 128 on the retainer hasp 126 and then enters the retainer space 112, pushing and pivoting the retainer hasp 126 from the retaining position to the release position, as illustrated in FIGS. 8 and 9. In some embodiments, the tapered or beveled distal arm end 110 of the base arm 108 may facilitate entry of the horizontal component 162 on the ATV 160 into the retainer space 112. As the horizontal component 162 clears or passes beyond and disengages the retaining vertex 131 on the retainer hasp 126, the retaining hasp 126 may return to the retaining position illustrated in FIG. 10 typically under the influence of gravity as the hasp retaining member 136 typically falls back onto the upper surfaces of the arm plates 117 of the retainer assembly arm 116. Accordingly, it will be appreciated by those skilled in the art that, upon subsequent inadvertent reverse movement of the ATV 160 on the trailer 166, the horizontal component 162 may engage the interior edge 129 of the retainer hasp 126. However, the hasp retaining member 136 may retain the retainer hasp 126 in the retaining position and thereby prevent the horizontal component 162 of the ATV 160 from inadvertently exiting the retainer space 112. Therefore, the retainer hasp 126 may retain the horizontal component 162 in the retainer space 112 and maintain the position, stability and security of the ATV 160 on the trailer 166 typically as the trailer 166 is towed by a towing vehicle (not illustrated) in transport of the ATV 160. In some applications, a retaining pin (not illustrated) may be inserted through the registering hasp retaining receptacles 124 on the retainer assembly arm 116 to ensure that the retainer hasp 126 remains in the retaining position in the retainer space 112 as the horizontal component 162 remains retained in the retainer space 112. In some applications, a padlock (not illustrated) may be inserted through the lock opening 134 in the retainer hasp 126 to lock the retainer hasp 126 in the retaining position in the retainer space 112. This expedient may prevent intentional and unauthorized disengagement of the ATV 160 from the vehicle securing apparatus 100 and theft of the ATV 160.

When it is desired to remove the ATV 160 from the trailer 166, the retainer hasp 126 may be manually pivoted from the retaining position illustrated in FIG. 10 to the release position illustrated in FIG. 11. This may be accomplished by lifting the hasp retaining member 136 from the arm plates 117 of the retainer assembly arm 116 as the retainer hasp 126 pivots about the hasp fastener 140, typically in the clockwise direction illustrated in FIGS. 10 and 11, such that the retaining vertex 131 of the retainer hasp 126 clears the retainer space 112 and inserts upwardly through the arm space 122 of the retainer assembly arm 116. The retainer hasp 126 may continue to be pivoted in the clockwise direction until the retainer hasp 126 falls back to the rearward-facing suspended position illustrated in FIG. 12. Thus, as the ATV 160 is subsequently driven in reverse, the horizontal component 162 may initially engage the now interiorly-facing exterior edge 128 of the retainer hasp 126, partially pivot the retainer hasp 126 in the counterclockwise direction and exit the retainer space 112. The retainer hasp 126 may then be manually pivoted in the counterclockwise direction back to the retaining position illustrated in FIG. 7 preparatory to subsequently again securing the ATV 160 in the trailer 166.

Figure 13:
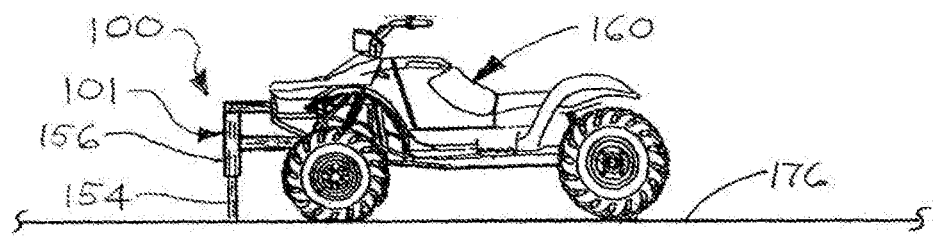
FIG. 13 is a side view of an illustrative embodiment of the vehicle securing apparatuses, securing an ATV in place on the ground in typical application of the vehicle securing apparatuses.
Figure 14:
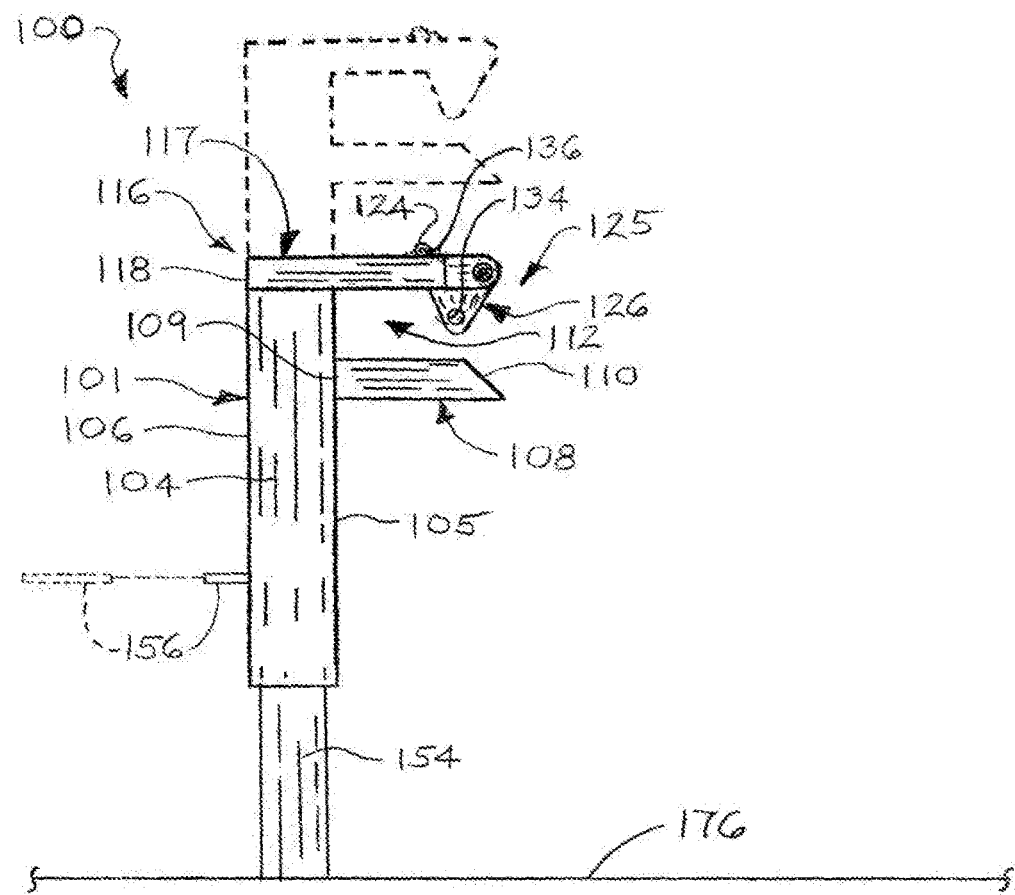
FIG. 14 is a side view of the illustrative vehicle securing apparatus illustrated in FIG. 13, more particularly illustrating selective height adjustment of the vehicle securing apparatus.

Referring next to FIGS. 13 and 14 of the drawings, in some embodiments, the vehicle securing apparatus 100 may be deployed on the ground or other surface 176 to secure the ATV 160 in a secure and stable position on the surface 176. Accordingly, the main support arm 101 may be secured in the surface 176 according to the knowledge of those skilled in the art. In some embodiments, the main support arm 101 may be height-adjustable or length-adjustable and may include an apparatus mount member 154 which may be secured in the surface 176 according to the knowledge of those skilled in the art. The main support arm 101 may be telescopically adjustable with respect to the apparatus mount member 154. An adjustment pin 156 may be inserted through a selected one of multiple, vertically spaced-apart pin openings (not illustrated) in the main support arm 101 and through a registering pin opening (not illustrated) in the apparatus mount member 154 to select and secure the height of the base arm 108 and retainer assembly arm 116 above the surface 176.

In typical application, the ATV 160 may be secured to the vehicle securing apparatus 100 as was heretofore described with respect to FIGS. 7-12. Accordingly, the vehicle securing apparatus 100 may secure the ATV 160 in a stable position on the surface 176. In some applications, a retaining pin (not illustrated) may be inserted through the registering hasp retaining receptacles 124 on the retainer assembly arm 116 to ensure that the retainer hasp 126 remains in the retaining position in the retainer space 112 as the horizontal component 162 of the ATV 160 remains in place in the retainer space 112. In some applications, a padlock (not illustrated) may be inserted through the lock opening 134 in the retainer hasp 126 to lock the retainer hasp 126 in the retaining position in the retainer space 112. Prior to engagement of the ATV 160 with the vehicle securing apparatus 100, the height of the main support arm 101 and the retainer assembly arm 116 and retainer assembly 125 may be adjusted to vertically orient and align the retainer space 112 with the horizontal component 162 on the ATV 160. In some embodiments, this may be carried out typically by telescopically adjusting the main support arm 101 with respect to the apparatus mount member 154 and securing the main support arm 101 using the adjustment pin 156, as was heretofore described.

Figure 15:
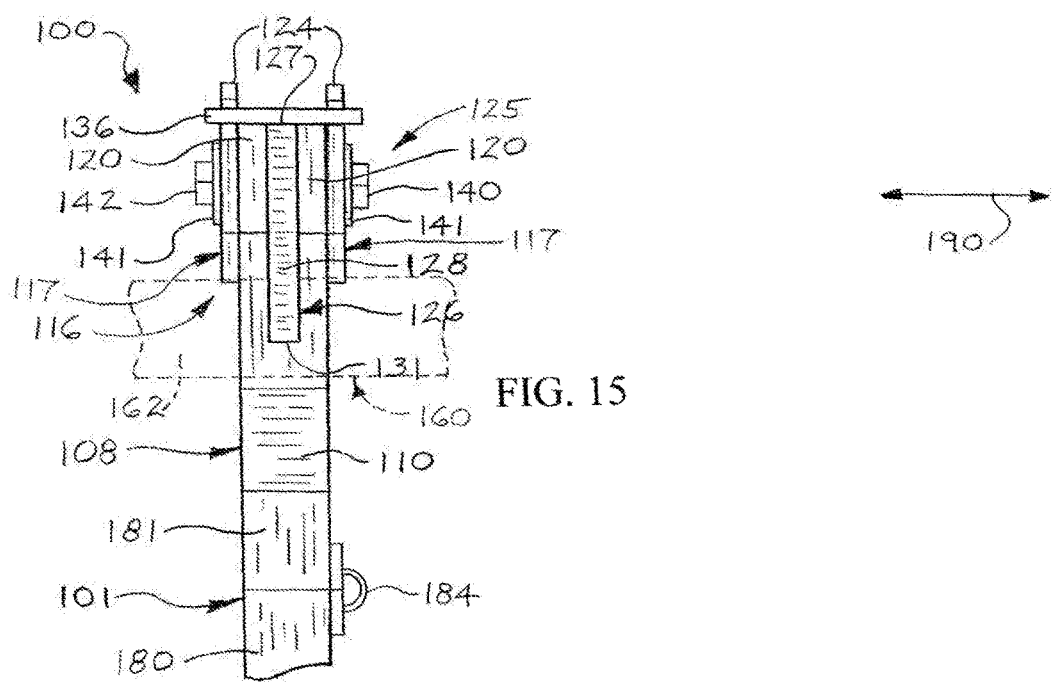
FIG. 15 is a rear view, partially in section, of an illustrative embodiment of the vehicle securing apparatuses, deployed in an upright position according to some applications of the vehicle securing apparatuses.
Figure 16:
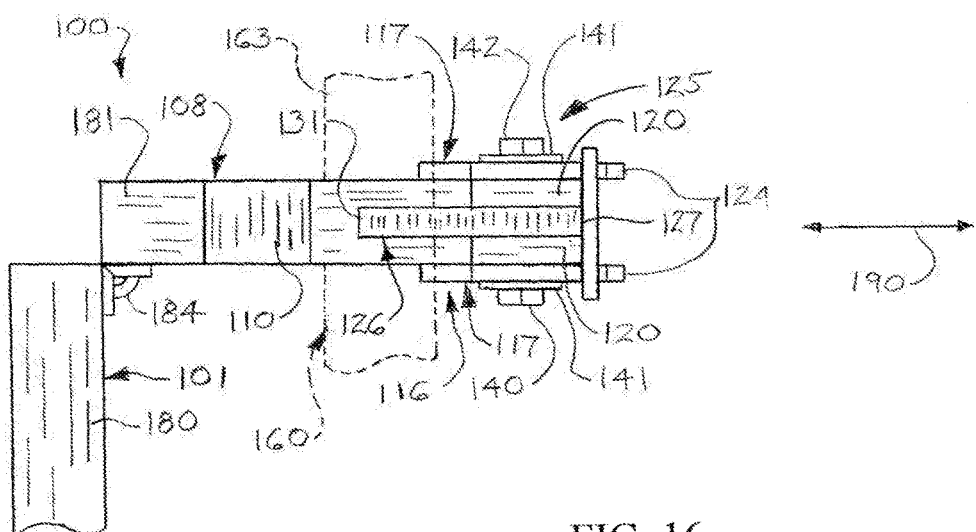
FIG. 16 is a rear view, partially in section, of the illustrative vehicle securing apparatus illustrated in FIG. 15, deployed in a horizontal position according to some applications of the vehicle securing apparatuses.

Referring next to FIGS. 15 and 16 of the drawings, in some embodiments, the main support arm 101 of the vehicle securing apparatus 100 may include a lower support arm segment 180 and an upper support arm segment 181. The lower support arm segment 180 may be mounted on the trailer front rail 170 (FIG. 4) or other structural component of the trailer 166, or alternatively, in the ground or other surface 176, as was heretofore described with respect to FIGS. 13 and 14. Still further in the alternative, the lower support arm segment 180 may be telescopically extendable with respect to an apparatus mount member 154, as was heretofore described with respect to FIGS. 13 and 14. The base arm 108 and the retainer assembly arm 116 may extend from the upper support arm segment 181 of the main support arm 101. A hinge mechanism 184 may pivotally connect the upper support arm segment 181 to the lower support arm segment 180. The hinge mechanism 184 may include any type of device or mechanism which facilitates pivoting of the upper support arm segment 181 relative to the lower support arm segment 180 and maintaining and stabilizing the upper support arm segment 181 relative to a selected angle relative to the lower support arm segment 180. Accordingly, the upper support arm segment 181 may be deployed and secured or maintained at a selected angle with respect to a horizontal plane 190. Therefore, the retainer assembly 125 on the retainer assembly arm 116 may be suitably positioned to orient the retainer space 112 (FIGS. 7-12) to align or register with and receive and retain a vertical component 163 (illustrated in phantom) on the structural member 161 (FIG. 1) of the ATV 160, or alternatively, any component on the structural member 161 which is oriented between a horizontal position and a vertical position.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A vehicle securing apparatus, comprising:
    an elongated main support arm;
    a base arm carried by the main support arm;
    an elongated retainer assembly arm including:
        a pair of generally parallel, spaced-apart arm plates carried by the main support arm in spaced-apart relationship to the base arm;
        a pair of plate flanges terminating the arm plates, respectively; and
        an arm space between the arm plates;
    a retainer space between the retainer assembly arm and the base arm; and
    a retainer assembly including:
        a generally triangular retainer hasp pivotally carried by the retainer assembly arm in the arm space, the retainer hasp pivotal from a gravity-induced retaining position extending into the retainer space to a release position substantially clearing the retainer space by application of force from outside and toward the retainer space against the retainer hasp, the retainer hasp having:
            a retaining edge;
            an exterior edge extending from the retaining edge;
            an interior edge extending from the retaining edge to the exterior edge;
            a pivot vertex between the retaining edge and the exterior edge, the retainer hasp pivotally carried by the retainer assembly arm at the pivot vertex;
            a retaining vertex between the exterior edge and the interior edge, the retaining vertex disposed within the retainer space in the retaining position of the retainer hasp; and
            a return vertex between the interior edge and the retaining edge; and
        a hasp retaining member carried by the retaining edge of the retainer hasp, the hasp retaining member generally elongated and oriented in transverse relationship with respect to a plane of the retainer hasp and protruding beyond opposite surfaces of the retainer hasp, the hasp retaining member normally engaging the arm plates of the retainer assembly arm and supporting the retainer hasp against gravity in the retaining position on the retainer assembly arm.

2. The vehicle securing apparatus of claim 1 further comprising at least one hasp retaining receptacle carried by at least one of the arm plates of the retainer assembly arm adjacent to the arm space.

3. The vehicle securing apparatus of claim 2 wherein the at least one hasp retaining receptacle comprises a pair of spaced-apart hasp retaining receptacles carried by the arm plates, respectively, of the retainer assembly arm on opposite sides of the arm space.

4. The vehicle securing apparatus of claim 1 further comprising at least one lock opening in the retainer hasp at the retaining vertex.

\* \* \* \* \*